(12) United States Patent
Washio

(10) Patent No.: US 10,869,492 B2
(45) Date of Patent: Dec. 22, 2020

(54) BEVERAGE PRODUCT AND METHOD AND APPARATUS FOR PRODUCING BEVERAGE PRODUCT

(71) Applicant: Nobuto Washio, Toyama (JP)

(72) Inventor: Nobuto Washio, Toyama (JP)

( * ) Notice: Subject to any disclaimer, the term of this patent is extended or adjusted under 35 U.S.C. 154(b) by 0 days.

(21) Appl. No.: 16/081,706

(22) PCT Filed: Mar. 3, 2017

(86) PCT No.: PCT/JP2017/008514
§ 371 (c)(1),
(2) Date: Aug. 31, 2018

(87) PCT Pub. No.: WO2017/150715
PCT Pub. Date: Sep. 8, 2017

(65) Prior Publication Data
US 2019/0069578 A1  Mar. 7, 2019

(30) Foreign Application Priority Data

Mar. 4, 2016 (JP) .................. 2016-001312
Mar. 4, 2016 (JP) .................. 2016-059214
Sep. 15, 2016 (JP) .................. 2016-004513

(51) Int. Cl.
*A23L 2/38* (2006.01)
*A23L 2/52* (2006.01)
(Continued)

(52) U.S. Cl.
CPC .................. *A23L 2/38* (2013.01); *A23L 2/00* (2013.01); *A23L 2/52* (2013.01); *A23L 2/68* (2013.01);
(Continued)

(58) Field of Classification Search
CPC ......... A23L 2/00; A23L 2/38; A23V 2300/12; A23V 2250/032; A23V 2250/044; A23V 2250/056; A23V 2250/61
See application file for complete search history.

(56) References Cited

U.S. PATENT DOCUMENTS 8,367,140 B2   2/2013  Fukuda et al.
2007/0259054 A1*  11/2007  Ayala ............... A61K 31/19
                                                              424/679

FOREIGN PATENT DOCUMENTS

CN         1582157       2/2005
CN        104411185      3/2015
(Continued)

OTHER PUBLICATIONS

Fitness Drink Gusto Limone, Mintel GNPD, 4 pgs.
(Continued)

*Primary Examiner* — Subbalakshmi Prakash
(74) *Attorney, Agent, or Firm* — Shweta Chandra; Bozicevic, Field & Francis LLP

(57) ABSTRACT

A beverage product comprising a beverage in a sealed container is provided. The beverage comprises, in water, a combination of buffering components selected from (a) citric acid and trisodium citrate, (b) tartaric acid and disodium tartrate, or (c) malic acid and disodium malate, and glucose and sodium chloride, wherein the beverage has a pH of lower than 4.0. A method and an apparatus suited for producing such a beverage product are also provided.

4 Claims, 2 Drawing Sheets

(51) Int. Cl.
*A23L 2/00* (2006.01)
*A23L 2/68* (2006.01)

(52) U.S. Cl.
CPC ..... *A23V 2002/00* (2013.01); *A23V 2250/032* (2013.01); *A23V 2250/044* (2013.01); *A23V 2250/056* (2013.01); *A23V 2250/61* (2013.01); *A23V 2300/12* (2013.01)

(56) References Cited

FOREIGN PATENT DOCUMENTS

| | | | |
|---|---|---|---|
| CN | 105239088 A | * | 1/2016 |
| JP | 09-029286 | | 2/1997 |
| JP | 2000-333653 | | 12/2000 |
| JP | 2002-125639 | | 5/2002 |
| JP | 2002-275007 | | 9/2002 |
| JP | 2003-164272 | | 6/2003 |
| JP | 2003-169642 | | 6/2003 |
| JP | 2007-510758 | | 4/2007 |
| JP | 2009-517025 | | 4/2009 |
| JP | 2011-103799 | | 6/2011 |
| JP | 2013-071103 | | 4/2013 |
| JP | 2013-094125 | | 5/2013 |
| JP | 2014-176322 | | 9/2014 |
| JP | 2015-156812 | | 9/2015 |
| JP | 2015-167523 | | 9/2015 |
| JP | 2016-131510 | | 7/2016 |
| JP | 3207696 | | 11/2016 |
| JP | 6059407 | | 12/2016 |
| KR | 20100016216 | | 2/2010 |
| KR | 101911289 | | 10/2018 |
| WO | WO-0166470 A1 | * | 9/2001 ............ A61K 33/00 |
| WO | WO 2008139725 | | 11/2008 |
| WO | WO 2015025898 | | 2/2015 |
| WO | WO 2015111356 | | 7/2015 |
| WO | WO 2015199053 | | 12/2015 |

OTHER PUBLICATIONS

Isotonic Drink Gusto Arancia, Mintel GNPD, 6 pgs.
Office Action of JP 2017-035883 dated Dec. 12, 2017, 4 pgs.
Office Action of JP 2017-035883 dated Apr. 3, 2018, 5 pgs.
Office Action of KR 2018-7003567 dated Apr. 18, 2018, 8 pgs.
Office Action of KR 2018-7003567 dated Aug. 21, 2018, 3 pgs.
Office Action of CN 201780014655.6 dated Feb. 25, 2019, 7 pgs.

\* cited by examiner

[Figure 1]
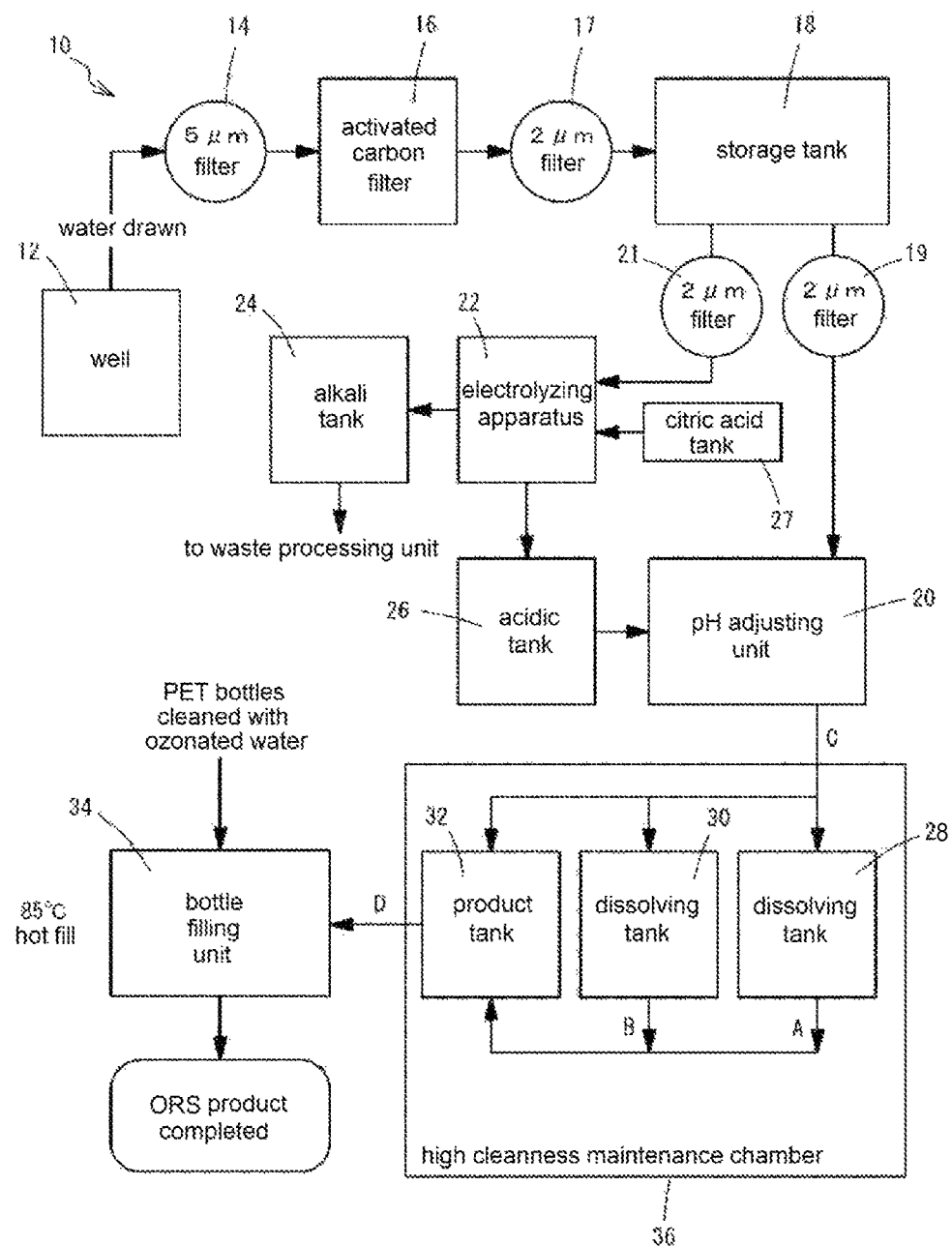

[Figure 2]
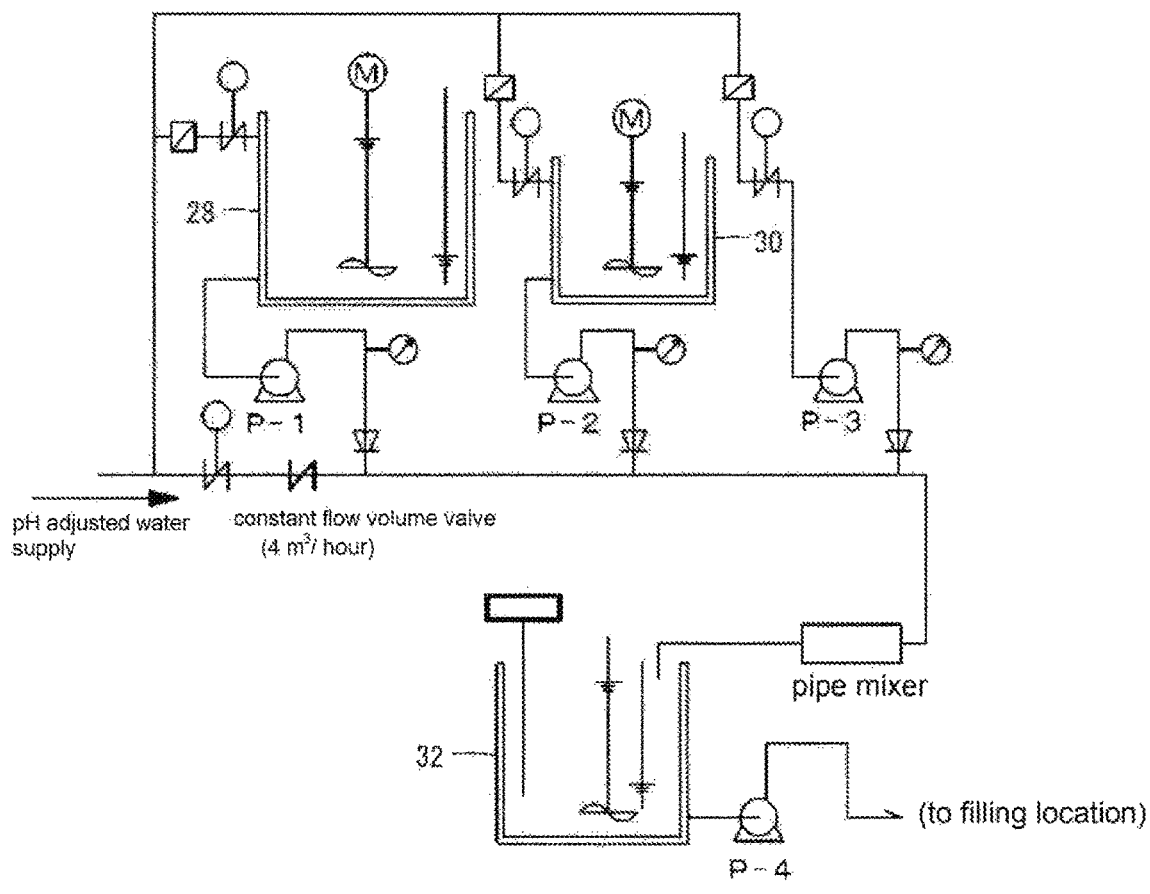

BEVERAGE PRODUCT AND METHOD AND APPARATUS FOR PRODUCING BEVERAGE PRODUCT

TECHNICAL FIELD

The present invention relates to a beverage product, a method for producing a beverage product, and an apparatus for producing a beverage product. In particular, the present invention relates to a Ready-To-Drink (RTD) beverage product sealed into a container, and a method and an apparatus for producing the beverage product.

BACKGROUND ART

In recent years, people are increasingly aware that frequent consumption of water is important for the prevention of, and the recovery from, illnesses such as heat stroke, severe dehydration, infections, cardiovascular diseases, and the likes as well as for the maintenance of overall health. Accordingly, in addition to the water products such as mineral waters, extremely diverse beverage products are being put on the market.

Especially notable is the type of beverage products called Oral Rehydration Solutions. The concept of Oral Rehydration Solution (ORS) was originally developed as a therapy for dehydration associated with diarrhea caused by e.g. cholera. The World Health Organization (WHO) is suggesting the following concentration requirements for acceptable Oral Rehydration Solutions (WHO Drug Information Vol. 16, No. 2, 2002).

Sodium: 60 to 90 mEq/L ($\geq$50 mEq/L for a reduced-osmolarity ORS)
Potassium: 15 to 25 mEq/L
Citrate: 8 to 12 mmol/L
Chloride: 50 to 80 mEq/L
Glucose: at least equal to the concentration of sodium but not exceeding 111 mmol/L
Total substance concentration (including that contributed by glucose): 200 to 310 mmol/L However, more recently, people are starting to realize that the Oral Rehydration Solutions (including the similar products that do not strictly fit the above-mentioned definition by the WHO; Hereinafter collectively referred to as "Oral Rehydration Solution products" including those sold in the containers) provide an excellent means of hydration even for healthy people, and they are sometimes produced and sold as general consumer products not necessarily intended for medical purposes. That is, it is becoming understood by the general public that drinking an Oral Rehydration Solution product is more effective for hydration compared to drinking water itself. In general, Oral Rehydration Solution products are distinguished from other beverage products in that they have an osmotic pressure nearly equaling that of a body fluid, and that they can efficiently supply electrolytes in addition to water. Thus, the Oral Rehydration Solution products provide a function similar to a medical-use physiological saline and promote smooth absorption of water and electrolytes into the body.

The market for RTD Oral Rehydration Solution products is expanding, and this trend is especially notable in Japan. In one drug store chain, the number of sales of the bottled Oral Rehydration Solution products more than quadrupled from 2013 to 2014, and the number is continuing to increase in 2015. Also, the bottles of Oral Rehydration Solution products can be seen ready-stocked in the households and by the local governments because the Oral Rehydration Solution products are a superior means of hydration than water itself in the time of refuge from a natural disaster or the like. In such a case, the Oral Rehydration Solution products are typically stored at room temperature for an extended period of time.

It goes without saying that palatability is important for beverage products that are commercially produced for general consumption. However, it is always challenging to produce a palatable beverage product safely and cheaply when there are various compositional constrains. In particular, it is not easy to develop palatable Oral Rehydration Solution products because they are constrained by the requirements for more salts (electrolytes, especially sodium salts) and less sugars.

Patent Literature 1 discloses an oral rehydration solution and other beverages having a sodium concentration of 0.02 to 0.12% by mass and not comprising a high-sweetness sweetener, characterized in that the beverages comprise fructose, sodium salt and malic acid.

CITATION LIST

Patent Literature

Patent Literature 1: Japanese Patent Application Laid-Open Publication No. 2015-167523

SUMMARY OF INVENTION

Technical Problem

The present invention provides novel RTD beverage products suitable for commercial production and long-term storage, and novel methods and apparatuses for producing such beverage products.

Solution to Problem

In one aspect, the present disclosure provides a beverage product comprising a beverage sealed in a container, the beverage comprising, in water, a combination of buffering components selected from (a) citric acid and trisodium citrate, (b) tartaric acid and disodium tartrate, or (c) malic acid and disodium malate, and glucose and sodium chloride, wherein the beverage has a pH of lower than 4.0.

In another aspect, the present disclosure provides a method for producing a beverage product, the method comprising: a step of electrolyzing a water containing an electrolyte to obtain an electrolyzed acidic water; a step of adding at least a combination of buffering components selected from (a) citric acid and trisodium citrate, (b) tartaric acid and disodium tartrate, or (c) malic acid and disodium malate to the electrolyzed acidic water to obtain a beverage; and a step of sealing the beverage into a container, wherein the beverage has a pH of lower than 4.0. In another aspect, the present disclosure provides a beverage product comprising an electrolyzed acidic water obtainable by electrolyzing a water containing an electrolyte.

In another aspect, the present disclosure provides an apparatus for producing a beverage product, the apparatus having: an electrolyzing apparatus to electrolyze a water to generate an electrolyzed acidic water; one or more tanks in which at least (a) citric acid and trisodium citrate, (b) tartaric acid and disodium tartrate, or (c) malic acid and disodium malate are added to the electrolyzed acidic water to generate a beverage; and a filling apparatus to seal the beverage into a container.

BRIEF DESCRIPTION OF DRAWINGS

FIG. 1 is a schematic diagram of the apparatus for producing a beverage product according to one embodiment.

FIG. 2 is a schematic diagram showing the equipment of each dissolving tank and the product tank of the apparatus for producing a beverage product according to one embodiment.

DESCRIPTION OF EMBODIMENTS

In one aspect of the present disclosure, a beverage product is provided. The beverage product of the present disclosure is most suited for an Oral Rehydration Solution product, but it could be any beverage product such as sports drink and carbonated drink. The beverage in the beverage product of the present embodiment is an aqueous solution based on water as solvent, and is buffered within an acidic range by containing a weak acid and its salt. The combination of the weak acid and its salt may be (a) citric acid and trisodium citrate, (b) tartaric acid and disodium tartrate, or (c) malic acid and disodium malate. In the present disclosure, these components may be referred to as "buffering components". The beverage in the beverage product of the present embodiment has a pH of lower than 4.0, preferably a pH of 3.0 to 3.8, more preferably a pH of 3.0 to 3.5, and still more preferably a pH of 3.2 to 3.5, for example a pH of 3.2 to 3.25. The pH mentioned in the present disclosure is that measured at 1 atm and 25° C.

Regarding the manufacturing of beverages, the Food Sanitation Act provides sterilization standards according to the pH of the beverages. That is, the acidic beverages having a pH of lower than 4.0 are required to use a sterilization process of 65° C. for 10 minutes or other sterilization processes of equivalent or greater effectiveness, whereas the acidic beverages having a pH of 4.0 or higher but lower than 4.6 are required to use a sterilization process of 85° C. for 30 minutes or other sterilization processes having equivalent or greater effectiveness. Also, it has been empirically observed that the heat sterilization is more effective for the beverages having a pH of lower than 4.0. Thus, since the products having a pH of 4.0 or higher should be subjected to more stringent heating conditions than those having a pH of lower than 4.0, they are prone to higher costs for the heating process, and more likely to lose the original flavors of their materials. It has been estimated that the fuel cost for the sterilization process can be reduced to about ¼ in the sterilization of the beverages having a pH of lower than 4.0, compared to the sterilization of the beverages having a pH of 4.0 or higher. Since the beverage product of the present embodiment has a pH of lower than 4.0, a heat sterilization under a mild condition will suffice, the costs of the sterilization process can be kept down, and the changes in the flavors or the appearances caused by the sterilization can be minimized.

Due to the buffering effect which depends on the above-mentioned buffering components, the pH of the beverage in the beverage product of the present embodiment is stable. In one example, when 10.0 mL or 18.0 mL of a 1.05 g/100 mL NaOH aqueous solution is added to 1 L of the beverage in the beverage product of the present embodiment, a pH of lower than 4.0, or no higher than 3.8, no higher than 3.6, no higher than 3.5, or no higher than 3.4 is maintained. In another example, when 43.0 mL of a 1.05 g/100 mL NaOH aqueous solution is added to 1 L of the beverage in the beverage product of the present embodiment, a pH of lower than 4.0, or no higher than 3.8, or no higher than 3.6 is maintained. Previously, in the manufacturing of the beverage products, a slight variation in the mix proportions of the ingredients made the pH variable, hence the product quality and the sterilization effectiveness were made variable, and the possibility of occurrence of defective products could not be ignored. The beverage product of the present embodiment can be manufactured stably at a pH of lower than 4.0. It is therefore superior in the qualitative stability and in the safety aspect, and it can also withstand long-term storage.

The beverage product of the present embodiment preferably contains the beverage in a sealed container. The container may be, but is not limited to, a bottle (for example, a plastic bottle such as polyethylene terephthalate (PET) bottle, and a glass bottle, especially a screw-top bottle and a bottle with a stopper), a can (for example, an aluminum can and a steel can, especially a can with a pull-tab, a can with a stay-on-tab, and a full aperture end can), or a pouch (for example, a pouch formed from plastic, metal, or a laminate thereof). The container may comprise a cap, a lid, a stopper or the like. Accordingly, in the present disclosure, the cap, lid, stopper or the like is understood to be part of the container. The container is preferably marked with a shelf life of the beverage product, and the shelf life may be at least 6 months, at least 9 months, at least 12 months, or at least 24 months from the sealing date (i.e. the production date). The shelf life may be expressed in a variety of ways. For example, if the container is marked with an expiration date of the beverage product and the expiration date is a date that is 12 months after the production date of the beverage product, then, the container is understood to be marked with a shelf life of the beverage product which is 12 months. The "marking" of the shelf life may be achieved also in a variety of ways, such as by printing, sticking, embossing, and engraving.

The beverage in the beverage product of the present embodiment preferably comprises at least glucose and sodium chloride in addition to the buffering components. Sodium chloride provides a physiologically important electrolyte. Glucose facilitates the water- and sodium-uptake by the cells. The amount of sugars comprised in the beverage of the beverage product is preferably 27 g/L or less, more preferably 25 g/L or less, and still more preferably 20 g/L or less. The amount of glucose comprised in the beverage of the beverage product is preferably 12 to 27 g/L, more preferably 13 to 25 g/L, and still more preferably 15 to 20 g/L. In one example, the beverage of the beverage product does not comprise a non-glucose sugar. In the present disclosure, the term sugar means monosaccharide or disaccharide, not including sugar alcohol.

The beverage in the beverage product of the present embodiment preferably has a protein content of 0 to 10 mg/L, and more preferably contains substantially no proteins, i.e. it has a protein content of 0 mg/L. The beverage in the beverage product of the present embodiment preferably has a fat content of 0 to 10 mg/L, and more preferably contains substantially no fats, i.e. it has a fat content of 0 mg/L. The calorie per 1 L of the beverage in the beverage product of the present embodiment is preferably 200 kcal or lower, more preferably 150 kcal or lower, more preferably 120 kcal or lower, and still more preferably 100 kcal or lower. Preferably, the amount of sodium comprised in the beverage of the present beverage product is 0.8 g/L or greater, for example 0.8 to 1.2 g/L. Preferably, the beverage of the present beverage product comprises 2 to 3 g/L of sodium chloride.

The beverage of the present beverage product preferably comprises 7.5 to 15 g/L of citric acid (or tartaric acid or malic acid). The amount of citric acid (or tartaric acid or malic acid) comprised is preferably 14 g/L or less, more preferably 13 g/L or less, still more preferably 12 g/L or less, and most preferably 11.9 g/L or less. The beverage of the present beverage product preferably comprises 2.5 to 8.0 g/L of trisodium citrate (or disodium tartrate or disodium malate). The amount of trisodium citrate (or disodium tartrate or disodium malate) comprised is preferably 7.0 g/L or less, more preferably 6.0 g/L or less, still more preferably 5.0 g/L or less, and most preferably 4.4 g/L or less. The total concentration of these acids and the corresponding salts is preferably 80 mM or lower, more preferably 79 mM or lower. Importantly, in the present embodiment, these buffering components act not only as buffering agents but also as acidulants. In general, the beverage products having high salt contents and low sugar contents (Oral Rehydration Solution products, in particular) are thought to be unpalatable. However, it was discovered that the beverage product of the present embodiment can provide a very palatable and refreshing taste based on the composition described herein in which the saltiness and the sourness cancel each other.

As described below, the water used as the solvent may be an electrolyzed acidic water. It is especially preferable that this electrolyzed acidic water be that obtained by electrolyzing a water in which citric acid and trisodium citrate have been dissolved. An even more palatable taste in addition to excellent pH stability can be thereby realized in the final product.

The phosphorus content in the beverage in the beverage product of the present embodiment is 0 to 5 mg/L. The phosphorus content is preferably 0 to 3 mg/L, more preferably 0 to 1 mg/L, and even more preferably 0 to 0.5 mg/L. Most preferably, the present beverage comprises substantially no phosphorus, i.e. its phosphorus content is 0 mg/L.

In general, the Oral Rehydration Solution products as well as other beverage products currently on the market often contain phosphoric acid or other phosphate compounds. Phosphoric acid and phosphate compounds are approved under the Food Sanitation Act for the use in beverages, and they can provide such effects as adjustment of the pH and addition of a sour taste. However, phosphoric acid can easily and directly bind to the calcium in the body, and it binds to the constitutive calcium of the bones and induces dischargement of the calcium to the outside of the body especially when mineral uptake by the body is lacking. Such tendency is especially evident in old people. The phosphate compounds have the same results as they are converted to phosphoric acid by the gastric acid when ingested. Although phosphorus itself is an essential element for the body, there is no need to try to take it actively, since phosphorus is contained relatively abundantly in diverse ordinary foods.

Preferably, the beverage product of the present embodiment reduces the use of phosphorus, or, completely avoids the use of phosphorus. Citric acid, tartaric acid, and malic acid are contained in many natural foods such as citrus fruits and wines. Citric acid, in particular, is a useful element fundamentally involved in the bodily metabolism, in the citric acid cycle within the body. Citric acid is consumed within the body, and unlike phosphorus, it does not have the risk of binding to the minerals such as calcium and forcing the expulsion of the minerals to outside of the body. Citric acid is therefore completely useful for the body.

The beverage in the beverage product of the present embodiment preferably has an osmolarity of 200 to 310 mOsm/L, more preferably 220 to 300 mOsm/L, and even more preferably 240 to 280 mOsm/L. The osmolarity relates to the osmotic pressure. The osmolarity ranges mentioned above are similar to, or slightly lower than, 310 mOsm/L which is equivalent to the osmotic pressure of the human plasma. The absorption of water and the electrolytes by the intestines is thereby facilitated.

Preferably, the beverage in the beverage product of the present embodiment further comprises one or more of potassium carbonate, potassium chloride, magnesium sulfate, and potassium lactate. In one example, the beverage in the beverage product comprises potassium carbonate and potassium chloride. In one example, the beverage in the beverage product comprises potassium carbonate, potassium chloride, and magnesium sulfate. In one example, the beverage in the beverage product comprises potassium lactate and magnesium sulfate.

The beverage in the beverage product preferably comprises a flavor enhancer. Examples of the flavor enhancers include, but are not limited to, glutamates including sodium glutamate, glutamic acid, guanylic acid and salts thereof, and inosinic acid and salts thereof. The beverage in the beverage product preferably comprises a sweetener. Examples of the sweeteners include, but are not limited to, sucralose, reducing palatinose, xylitol, acesulfame K, maltitol, aspartame, licorice, and stevia. The beverage in the beverage product preferably comprises a flavoring agent. The flavoring agent can be any flavoring agents acceptable for use in foods and beverages. The beverage in the beverage product of the present embodiment may comprise a flavor enhancer, a sweetener, and a flavoring agent, for example sodium glutamate, sucralose, and a flavoring agent.

In one preferable example, the beverage in the beverage product comprises citric acid (or tartaric acid or malic acid), trisodium citrate (or disodium tartrate or disodium malate), glucose, sodium chloride (table salt), and magnesium sulfate. In another preferable example, the beverage in the beverage product comprises citric acid (or tartaric acid or malic acid), trisodium citrate (or disodium tartrate or disodium malate), glucose, sodium chloride (table salt), potassium carbonate, potassium chloride, and magnesium sulfate. In another preferable example, the beverage in the beverage product comprises citric acid (or tartaric acid or malic acid), trisodium citrate (or disodium tartrate or disodium malate), glucose, sodium chloride (table salt), potassium lactate, glutamine, and magnesium sulfate. In still another preferable example, the beverage in the beverage product comprises, in addition to the above components, sucralose and a flavoring agent, or sodium glutamate, sucralose, and a flavoring agent.

The beverage in the beverage product preferably comprises 40 to 80 mM citric acid (or tartaric acid or malic acid), and 10 to 30 mM trisodium citrate (or disodium tartrate or disodium malate). Alternatively, the beverage comprises a total concentration of 80 mM or lower, more preferably 79 mM or lower, of: (a) citric acid and trisodium citrate; (b) tartaric acid and disodium tartrate; or (c) malic acid and disodium malate. The beverage preferably comprises 70 to 111 mM of glucose. The beverage preferably comprises 35 to 50 mM of sodium chloride. The molar concentration of glucose is preferably at least two folds higher than the molar concentration of sodium chloride. In one example, the beverage comprises 4 to 10 mM potassium carbonate and 3 to 9 mM potassium chloride. In one example, the beverage comprises 0.5 to 2 mM magnesium sulfate. These beverages may comprise a flavor enhancer at 0.5 g/L or lower, for example sodium glutamate. These beverages may comprise a sweetener at 0.5 g/L or lower, for example sucralose. These beverages may comprise a flavoring agent at 0.05 g/L or lower.

In one specific example, the beverage in the beverage product comprises sodium at 50 to 90 mEq/L, potassium at 15 to 25 mEq/L, chloride at 50 to 80 mEq/L, and glucose at a molar concentration at least equal to that of sodium but not exceeding 111 mmol/L, and has a osmolarity of 200 to 310 mmol/L. In another specific example, the beverage in the beverage product comprises 11.9 g/L of citric acid, 4.38 g/L of trisodium citrate, 18 g/L of glucose, 2.57 g/L of sodium chloride (table salt), 0.97 g/L of potassium carbonate, 0.44 g/L of potassium chloride, 0.12 g/L of magnesium sulfate, 0.18 g/L of sodium glutamate, 0.17 g/L of sucralose, and 0.01 g/L of a flavoring agent.

The beverage product of the present embodiment can be produced by dissolving each of the above-mentioned components in water. That is, a method for producing a beverage product according to one embodiment comprises: dissolving, in water, a combination of buffering components selected from (a) citric acid and trisodium citrate, (b) tartaric acid and disodium tartrate, or (c) malic acid and disodium malate, and glucose and sodium chloride to obtain an aqueous solution; and sealing the aqueous solution into a container, wherein the amounts of the buffering components are adjusted such that the pH of the final aqueous solution is buffered at lower than 4.0, at 3.0 to 3.8, at 3.0 to 3.5, at 3.2 to 3.5, or at 3.2 to 3.25. The step of obtaining the aqueous solution or the step of sealing the aqueous solution into a container may comprise a sterilization treatment of the beverage. The concentration of the acid mentioned above may be for example 50 to 70 mM, and the concentration of its sodium salt may be for example 15 to 25 mM. The total concentration of the acid and its salt is preferably 80 mM or lower, more preferably 79 mM or lower. Whether or not the product is sufficiently buffered can be verified by adding a 1.05 g/100 mL NaOH aqueous solution and observing the extent of the pH change, as described above.

In one example, the beverage product of the present embodiment may be produced by first dissolving the (a), (b), or (c) components in water to produce a base solution buffered within the above-mentioned pH range, then further dissolving other components to obtain an aqueous solution, and sealing the aqueous solution into a container. When hydrated compounds of the components are available, the hydrated compounds may be used for the dissolving. In the present disclosure, dissolving a component in, or adding a component to, a solvent such as water includes not only dissolving/adding the component directly in/to the solvent, but also combining a solution of the component with the solvent.

In one aspect, the present disclosure provides a method for producing a Rehydration Solution without using any phosphorus component, wherein a base solution which is a buffered solution having a pH of 3.2 to 3.5 is produced by using citric acid and trisodium citrate. In another aspect, the present disclosure provides a volume control type automatic mixing apparatus which produces a base solution which is a buffered solution having a pH of 3.2 by using citric acid and trisodium citrate, for the production of a Rehydration Solution without using any phosphorus component.

Further, the present inventor developed a method and an apparatus for production suitable for efficiently and consistently producing an acidic beverage product at an industrial scale. These method and apparatus for production can ensure efficient production of a beverage product having a pH of lower than 4.0, at a consistent concentration and a consistent pH.

In one aspect, a method for producing a beverage product is provided, the method comprising a step of electrolyzing a water containing an electrolyte to obtain an electrolyzed acidic water, a step of adding at least a combination of buffering components selected from (a) citric acid and trisodium citrate, (b) tartaric acid and disodium tartrate, or (c) malic acid and disodium malate to the electrolyzed acidic water to obtain a beverage, and a step of sealing the beverage into a container, wherein the pH of the beverage is lower than 4.0. Preferably, the step of obtaining the beverage further comprises adding glucose and sodium chloride to the electrolyzed acidic water.

In a more specific aspect, a method for producing a beverage product is provided, the method comprising a step of electrolyzing a water containing an electrolyte to obtain an acidic water, a step of mixing the acidic water with a non-electrolyzed water to obtain a pH-adjusted water having a pH no higher than a pre-determined value, a step of adding at least a combination of buffering components selected from (a) citric acid and trisodium citrate, (b) tartaric acid and disodium tartrate, or (c) malic acid and disodium malate to the pH-adjusted water to obtain a beverage, and a step of sealing the beverage into a container, wherein the pH of the beverage is lower than 4.0. Preferably, the step of obtaining the beverage further comprises adding glucose and sodium chloride to the pH-adjusted water.

The step of obtaining the beverage or the step of sealing the beverage into a container may comprise a sterilization treatment of the beverage. In another aspect, a beverage product produced by any of these methods for production is provided.

The electrolyte referred to above is added to water to facilitate the electrolysis. This electrolyte may comprise (a) citric acid, (b) tartaric acid, or (c) malic acid, or (a) trisodium citrate, (b) disodium tartrate, or (c) disodium malate, or (a) citric acid and trisodium citrate, (b) tartaric acid and disodium tartrate, or (c) malic acid and disodium malate. It is preferable to provide (a) citric acid and trisodium citrate, (b) tartaric acid and disodium tartrate, or (c) malic acid and disodium malate as electrolytes present during the electrolysis, and it is especially preferable to provide (a) citric acid and trisodium citrate as electrolytes present during the electrolysis. The ratio between the acid and its salt added at this stage may be the same as the ratio between the acid and its salt comprised in the final beverage product. In the present disclosure, the sodium salt used as an electrolyte and/or a buffering component may be replaceable with a potassium salt. The amount of (a), (b), or (c) components added to water at the time of electrolysis may provide 1% or less, 5% or less, 10% or less, 30% or less, 50% or less, 70% or less, 90% or less, 95% or less, or 99% or less of the amount (in weight or moles) of these components comprised in the final beverage product. For example, when the citric acid concentration in the final beverage product is 60 mM, about 90% of it may originate from the citric acid added before the electrolysis, and the remaining about 10% may originate from the citric acid added after the electrolysis.

The water may be groundwater, well water, spring water, tap water, distilled water, ion-exchanged water, or the likes. A water sterilized by e.g. a filtration or heat treatment is preferred. As known to those skilled in the art, an acidic water (that is, an electrolyzed acidic water) can be obtained by carrying out electrolysis with an electrolyzing apparatus having an anode, a cathode, and a diaphragm. If the acidic water obtained is mixed with a non-electrolyzed water, the non-electrolyzed water may be the same water used for the electrolysis, or it may be from a different source.

Each parameter of the electrolysis (e.g. the amount of electrolyte, the current intensity, and the duration of the electrolysis) as well as the mixing ratio to the non-electrolyzed water can be adjusted by those skilled in the art as appropriate based on ordinary knowledge of the art. The pH of the electrolyzed acidic water or pH-adjusted water thus obtained can be determined by those skilled in the art as appropriate, and it can be below 4.0, for example.

By using electrolysis and its product, the electrolyzed acidic water, a high-acidity water having a unique ionic composition can be obtained efficiently under controllable conditions. While not wishing to be bound by any particular theory, it was found that by using the electrolyzed acidic water, a more palatable taste and consistently low pH could be achieved in the presence of citric acid (or tartaric acid or malic acid) and its salt at relatively low concentrations and in the absence of phosphorus (or phosphate). In general, electrolyzed acidic waters could contain oxygen ($O_2$) as an electrolysis product, and the molecular oxygen has a potential to provide various functionalities. Therefore, the fact that an electrolyzed acidic water is used could make the product more attractive to the consumers. The oxygen concentration of the electrolyzed acidic water could be for example 8 ppm or higher, 10 ppm or higher, 12 ppm or higher, 15 ppm or higher, 20 ppm or higher, 30 ppm or higher, or 50 ppm or higher at 25° C. (in weight ppm). The possibility that other substances besides oxygen are generated and dissolved in the electrolyzed acidic water in the present embodiment is not excluded.

The amounts and the ratio of the buffering components, namely (a) citric acid and trisodium citrate, (b) tartaric acid and disodium tartrate, or (c) malic acid and disodium malate, in the final beverage product can be adjusted by a person skilled in the art depending on the intended pH and buffer strength, and they can be for example in the amounts described above. In the present disclosure, the symbols (a), (b) and (c) are meant to indicate a correspondence between the type of a component used in one step or element and the type of a component used in another step or element. That is, in the present example, if the electrolyte used was (a), then the buffering components used will be (a), and if the electrolyte used was (b), then the buffering components used will be (b).

In the present disclosure, if, for example, "citric acid and trisodium citrate, and glucose and sodium chloride are added to the pH-adjusted water", the substances recited may be added together, or added sequentially, and if added sequentially, the sequence may be changed, unless otherwise specified. For example, the citric acid and the trisodium citrate may be added at the same time in the same tank, added at the same time in different tanks, or added sequentially in different tanks. Other components described in the present disclosure may be added during the step of adding the buffering components, glucose and sodium chloride, or added during a separate step. Examples of these other components and combinations thereof have been described above. In one example, one or more selected from potassium carbonate, potassium chloride, magnesium sulfate, and potassium lactate are added. In a further example, one or more selected from sodium glutamate, sucralose, and a flavoring agent are added. In one example, component(s) including citric acid is added to the pH-adjusted water in one tank (dissolving tank) and the other component(s) is added to the pH-adjusted water in another tank (dissolving tank), and the aqueous solutions generated in the two tanks are mixed in still another tank (product tank) to generate the beverage. A step of providing the pH-adjusted water to this mixed solution can be further added to dilute it to a predetermined concentration.

The sealing into a container may be completed within 10 minutes, within 30 minutes, within 1 hour, within 2 hours, within 3 hours, within 10 hours, or within 1 day of the step of obtaining the acidic water.

In the above, the production methods involving electrolysis and the production methods not necessarily involving electrolysis were mentioned. The descriptions of pH, pH stability (buffer property), phosphorus content, osmolarity, composition (the amounts and/or ratios of the components), container, and/or shelf life provided further above are applicable to the beverage products produced by these methods of production as well. That is, the beverages in the beverage products produced by these methods have a pH of lower than 4.0, preferably 3.0 to 3.8, more preferably 3.0 to 3.5, and still more preferably 3.2 to 3.5, for example 3.2 to 3.25. Also, the beverages in the beverage products produced by these methods can maintain a pH of lower than 4.0, or no higher than 3.8, no higher than 3.6, no higher than 3.5, or no higher than 3.4 when 10.0 mL or 18.0 mL of a 1.05 g/100 mL NaOH aqueous solution is added to 1 L of the beverage. In other examples, the beverages in the beverage products produced by these methods can maintain a pH of lower than 4.0, or no higher than 3.8, or no higher than 3.6 when 43.0 mL of a 1.05 g/100 mL NaOH aqueous solution is added to 1 L of the beverage. The beverages in the beverage products produced by these methods preferably do not substantially comprise phosphorus. That is, these methods do not comprise any step that involves adding a phosphorus-containing compound to the solution, or the methods exclude any step that involves adding a phosphorus-containing compound to the solution. These methods may further comprise a step of marking a shelf life of the beverage product on the container, and the shelf life may be at least 6 months, at least 9 months, at least 12 months, or at least 24 months from the sealing date. The step of marking a shelf life of the beverage product on the container may be carried out before, during, or after the sealing of the container.

The use of the electrolyzed acidic water in a beverage was itself unprecedented. Thus, in another aspect, the present disclosure provides a beverage product comprising an electrolyzed acidic water obtainable by electrolyzing a water containing an electrolyte. Further, the present disclosure provides a method of producing a beverage product comprising a step of electrolyzing a water containing an electrolyte to obtain an electrolyzed acidic water and a step of adding other components (e.g. sugar, sweetener, and flavoring agent) to the electrolyzed acidic water. The electrolyte preferably comprises at least one substance selected from the group consisting of citric acid, tartaric acid, malic acid, trisodium citrate, disodium tartrate, and disodium malate. The electrolyte more preferably comprises (a) citric acid and trisodium citrate, (b) tartaric acid and disodium tartrate, or (c) malic acid and disodium malate, and especially preferably comprises citric acid and trisodium citrate. The descriptions of pH, other components which could be added, the form of the container to be sealed into, etc. provided for the beverage products in other aspects of the present disclosure are applicable to this beverage product as well.

In another aspect, an apparatus for producing a beverage product is provided, the apparatus having: an electrolyzing apparatus to electrolyze a water to generate an electrolyzed acidic water; one or more tanks in which at least (a) citric acid and trisodium citrate, (b) tartaric acid and disodium tartrate, or (c) malic acid and disodium malate are added to the electrolyzed acidic water to generate a beverage; and a filling apparatus to seal the beverage into a container.

In another, more specific aspect, an apparatus for producing a beverage product is provided, the apparatus having: an electrolyzing apparatus to electrolyze a water; a pH adjusting unit (pH adjusting apparatus or pH adjusting device) to mix an acidic water generated from the electrolysis by the electrolyzing apparatus with a non-electrolyzed water to obtain a pH adjusted water having a pH no higher than a predetermined value; a first dissolving tank in which a first component is added to the pH adjusted water; a second dissolving tank in which a second component comprising (a) citric acid, (b) tartaric acid, or (c) malic acid is added to the pH adjusted water; a product tank in which the aqueous solutions generated in the first and second dissolving tanks are mixed to produce a beverage; and a filling unit, downstream of the product tank, to fill a container with the beverage produced in the product tank and seal the container. The first component may contain (a) trisodium citrate, (b) disodium tartrate, or (c) disodium malate, or the second component may further contain (a) trisodium citrate, (b) disodium tartrate, or (c) disodium malate.

The electrolyzing apparatus may, as known to those skilled in the art, have an anode, a cathode, and a diaphragm that separates the acidic water and the alkaline water. The water may be groundwater, well water, spring water, tap water, distilled water, ion-exchanged water, or the likes. A filter for removing insolubles or for sterilization may be provided between the water source and the electrolyzing apparatus. The non-electrolyzed water to be mixed with the acidic water thus obtained may be the same water used for the electrolysis, or it may be a water coming from a different source. The pH of the pH adjusted water may be determined by a person skilled in the art as appropriate and it may be lower than 4.0, for example. (a) Trisodium citrate and (a) citric acid may be both comprised in the second component, or alternatively, trisodium citrate and citric acid may be comprised in the first and second components, respectively. The same can be said for (b) disodium tartrate and (b) tartaric acid, or (c) disodium malate and (c) malic acid. That is, the acid and its salt of the buffering components may be added in the same tank, or in different tanks. In the present disclosure, the terms "first", "second" and the likes are used for the convenience of distinguishing the elements and not necessarily for specifying an order.

The product tank may be connected to the pH adjusting unit. In that case, the pH adjusted water is supplied from the pH adjusting unit to the product tank, and the mixture of the aqueous solutions in the product tank can be diluted to a predetermined, or a desired, concentration.

The electrolyzing apparatus may be connected to a electrolyte tank that supplies an electrolyte to the water to be electrolyzed. The electrolyte may comprise (a) citric acid, (b) tartaric acid or (c) malic acid, or (a) trisodium citrate, (b) disodium tartrate or (c) disodium malate, or (a) citric acid and trisodium citrate, (b) tartaric acid and disodium tartrate or (c) malic acid and disodium malate. It is preferable to supply (a) citric acid and trisodium citrate, (b) tartaric acid and disodium tartrate or (c) malic acid and disodium malate as electrolytes present during electrolysis, and it is especially preferable to supply (a) citric acid and trisodium citrate as electrolytes present during electrolysis.

The descriptions of pH, pH stability (buffer property), phosphorus content, osmolarity, composition (the amounts and/or ratios), container, and/or shelf life provided further above are applicable to the beverage product produced by the production apparatus of the present embodiment as well. That is, the production apparatus of the present embodiment may be configured in such a way as to achieve the above-mentioned pH, pH stability (buffer property), phosphorus content, osmolarity, composition (the amounts and/or ratios), container, and/or shelf life. Thus, the beverage in the beverage product produced by the apparatus for producing a beverage product according to the present embodiment may have a pH of lower than 4.0, preferably 3.0 to 3.8, more preferably 3.0 to 3.5, and still more preferably 3.2 to 3.5, for example 3.2 to 3.25. Also, the beverage in the beverage product produced by this apparatus can maintain a pH of lower than 4.0, or no higher than 3.8, no higher than 3.6, no higher than 3.5, or no higher than 3.4 when 10.0 mL or 18.0 mL of a 1.05 g/100 mL NaOH aqueous solution is added to 1 L of the beverage. In another example, the beverage in the beverage product produced by this apparatus can maintain a pH of lower than 4.0, or no higher than 3.8, or no higher than 3.6 when 43.0 mL of a 1.05 g/100 mL NaOH aqueous solution is added to 1 L of the beverage. The beverage in the beverage product produced by this apparatus preferably does not substantially comprise phosphorus. That is, the apparatus does not comprise an element that adds a phosphorus-containing compound to the solution, or the apparatus excludes any element that adds a phosphorus-containing compound to the solution.

In another aspect, an apparatus for producing a beverage product is provided, the apparatus having: an electrolyzing apparatus to electrolyze a ground water; a pH adjusting unit to mix an acidic water generated from the electrolysis by the electrolyzing apparatus with a non-electrolyzed ground water to obtain a pH adjusted water having a pH no higher than a predetermined value; one dissolving tank in which a predetermined component is dissolved in the pH adjusted water; the other dissolving tank in which other predetermined components including citric acid are dissolved in the pH adjusted water; a product tank in which the aqueous solution generated in the one dissolving tank and the aqueous solution generated in the other dissolving tank are mixed to produce a beverage product; and a bottle filling unit to fill a bottle with the beverage product produced in the product tank. The beverage product is preferably an Oral Rehydration Solution product.

The product tank may be connected to the pH adjusting unit. The pH adjusted water is thereby supplied from the pH adjusting unit to dilute the mix solution of the above-mentioned aqueous solutions in the product tank to a predetermined concentration.

The electrolyzing apparatus may be connected to a citric acid tank that supplies citric acid to be used for electrolysis.

The beverage product produced by the apparatus for producing a beverage product comprises citric acid and trisodium citrate dissolved therein and has a pH of lower than 4.0, preferably a pH of no higher than 3.8. Further, the pH is preferably lower than 3.5 and no lower than 3.0.

FIG. 1 is a schematic diagram of an apparatus 10 for producing a beverage product which is one example of the above-mentioned embodiment. To the apparatus 10 for producing a beverage product, a well 12 is provided, from which the ground water as a raw material is drawn. A 5 μm filter 14, an activated carbon filter 16, and a 2 μm filter 17 to filter the ground water drawn from the well 12, and a storage tank 18 to store the filtered ground water are provided in this order.

In the downstream of the storage tank 18, past a 2 μm filter 19, a pH adjusting unit 20 is provided, into which the filtered ground water is introduced. Also, in the downstream of the storage tank 18, past a different 2 μm filter 21, an electrolyzing apparatus 22 is provided in which the filtered ground water is introduced and electrolyzed. In the downstream of the electrolyzing apparatus 22, an alkali tank 24 to accommodate the electrolyzed alkali water and an acidic tank 26 to accommodate the electrolyzed acidic water are provided.

The electrolyzing apparatus 22 is connected to a citric acid tank 27 that supplies citric acid as an electrolyte. The citric acid concentration in the citric acid tank 27 may be for example 10 to 40%, 20 to 30%, or 25% (in weight %). The alkali water obtained in the electrolysis is not needed and it can be therefore transferred from the alkali tank 24 to a waste processing unit for disposal, or the alkali water can be utilized for other purposes. The acidic water obtained in the electrolysis is stored in the acidic tank 26, and introduced to the pH adjusting unit 20 to be used for the pH adjustment.

In the downstream of the pH adjusting unit 20, a dissolving tank 28 in which the predetermined components including sweetener etc. are dissolved in the pH adjusted water C adjusted by the pH adjusting unit 20, and a dissolving tank 30 in which the other predetermined components including citric acid are dissolved are provided. The dissolving tank 28 and the dissolving tank 30 are each directly connected to the pH adjusting unit 20. In the downstream of the dissolving tank 28 and the dissolving tank 30, a product tank 32 is provided in which the solution A made in the dissolving tank 28 and the solution B made in the dissolving tank 30 are mixed to produce an Oral Rehydration Base Solution. The product tank 32 is also connected to the pH adjusting unit 20, thereby the pH adjusted water C is introduced to dilute the accommodated Oral Rehydration Base Solution to a suitable concentration to produce the beverage product D. The dissolving tank 28, the dissolving tank 30, and the product tank 32 are placed in a high cleanness maintenance chamber 36.

FIG. 2 shows one example of the facilities of the dissolving tank 28, dissolving tank 30, and product tank 32. On the supply route of the pH adjusted water C for each tank, a solenoid valve and an integrating flow meter equipped with a flow volume control are provided as indicated by the symbols. By adjusting the flow volume of the pH adjusted water C flowing into each of the tanks 28, 30, and 32, the aqueous solution A, the aqueous solution B, and the beverage product D having consistent concentrations are produced in a continuous manner. A quality check sensor which measures the pH etc. is provided in the product tank 32 to ensure the quality such as pH.

In the downstream of the product tank 32 and outside the high cleanness maintenance chamber 36, a bottle filling unit 34 is provided to fill PET bottles with the beverage product D made in the product tank 32. Here, the PET bottles that have been cleaned with ozonated water are filled with the beverage product D. The filling is carried out in "hot fill" at 85° C., and subsequently the bottles are sealed to complete the products.

The beverage product D produced by the apparatus 10 for producing a beverage product has the pH adjusted by the acidic water and comprises citric acid and trisodium citrate serving as pH buffering agents, and therefore its pH is lower than 4.0, preferably 3.8 to 3.0, and more preferably 3.5 to 3.2. For example the pH is adjusted to about 3.2. It is thereby possible to ship out the products with sterilization at a mild heating condition. Especially high storability is obtained when the beverage product D has a pH of 3.5 to 3.2.

The capacities of the tanks, and the types and the speeds of the pumps are shown in Table 1 below.

TABLE 1

|  | Dissolving tank 28 | Dissolving tank 30 | Product tank 32 |
|---|---|---|---|
| Capacity (m³) | 5 | 3 | 2 |
| Pump type | Tubing pump | Tubing pump | Centrifugal pump |
| Pump speed (L/min) | 8.3 | 5 | 83.3 |

In the dissolving tank A28, glucose, sucralose, and a flavoring agent are dissolved in the pH adjusted water C. In the dissolving tank B30, sodium chloride, citric acid, trisodium citrate, potassium lactate, magnesium sulfate, and sodium glutamate are dissolved in the pH adjusted water C. Other active ingredients etc. besides these may also be dissolved.

The concentrations and the osmolarities of the components, and their weights for producing 50 m³ in one day, as well as the tanks in which they are dissolved, in this particular embodiment are shown in Table 2 below.

TABLE 2

| Components | Concentration (g/l) | Osmolarity (mOsm/l) | Weight (kg/50 m³) | Tank |
|---|---|---|---|---|
| citric acid | 11.9 | 62 | 595 | Dissolving tank 30 |
| trisodium citrate | 4.38 | 17 | 219 | Dissolving tank 30 |
| glucose | 18 | 100 | 900 | Dissolving tank 28 |
| sodium chloride | 2.57 | 87.0 | 128.5 | Dissolving tank 30 |
| magnesium sulfate | 0.12 | 1.0 | 6 | Dissolving tank 30 |
| sodium glutamate | 0.18 | 1.1 | 9 | Dissolving tank 30 |
| sucralose | 0.17 | — | 8.5 | Dissolving tank 28 |
| flavor (8211) | 0.01 | — | 0.5 | Dissolving tank 28 |
| Oral Rehydration Solution D | — | Total 293.9 | — | — |

The beverage product D produced with the formulation shown in Table 2 has a pH of 3.2. It has 62 mmol of citric acid and 17 mmol of trisodium citrate dissolved per 1 L of water, and therefore its pH is equivalent to a pH 3.17 buffer solution. The osmolarity of the beverage product D is 293.9 mOsm/L, which is slightly lower than 310 mOsm/L, plasma osmolarity of the human body. It is thereby possible for the intestines to quickly absorb the water and the electrolytes.

According to the apparatus 10 for producing a beverage product of this embodiment, a beverage product D having a consistent concentration can be produced continuously and efficiently. The beverage product D produced by the apparatus 10 for producing a beverage product is an acidic aqueous solution whose pH is adjusted to a low level. Also, due to the inclusion of the citric acid and trisodium citrate serving as pH buffering agents, the pH is stably below 4.0, allowing sterilization at a milder heating condition, and therefore the costs of sterilization can be reduced, and the changes in the flavors or appearances of the beverage product D can also be avoided. Moreover, even when some anomalies occur during the production, the pH can always be kept below 4.0 or below 3.5. Due to this pH stability, it can also withstand long-term storage.

Moreover, the apparatus 10 for producing a beverage product can produce a beverage product D by dissolving citric acid, which is a harmless and useful substance for the human body, in a likewise harmless pH adjusted water C whose pH is adjusted with an acidic water generated by the electrolyzing apparatus 22. Thus, it does not use, as a pH reducing agent or the like, phosphate or any other substances consumption of which would need careful watching, and therefore it is safe. The electrolysis process also uses citric acid, and therefore an acidic water suitable for drinking can be produced.

The apparatus for producing a beverage product according to this embodiment is not limited to the specific examples described above, and it can be modified as appropriate. For example, the types of the filters for filtering the drawn ground water can be varied freely, and any types of water other than ground water can also be used. The water-soluble components dissolved in the dissolving tanks 28 and 30 can also be varied as appropriate, and it is also possible to increase or decrease the number of the dissolving tanks. Also, the bottles can be replaced by other types of containers.

EXAMPLE

To the beverage product D produced by using the method of the present embodiment according to the formula shown in Table 2, caustic soda (sodium hydroxide) was added to test the pH stability. That is, a caustic soda aqueous solution was prepared at 1.05 g/100 mL, and different amounts of this caustic soda aqueous solution were added to 1 L of the beverage product and the pH was measured. Six different amounts of the caustic soda aqueous solution ranging from 3.5 to 100 mL were used for the test. The results of the test are shown in Table 3 below.

TABLE 3

| Amount of caustic soda solution added ml (g) | pH |
|---|---|
| 3.5 ml (0.0367 g) | 3.20 |
| 6.0 ml (0.063 g) | 3.20 |
| 10.0 ml (0.105 g) | 3.25 |
| 18.0 ml (0.189 g) | 3.31 |
| 43 ml (0.451 g) | 3.51 |
| 100 ml (1.05 g) | 4.00 |

The table shows that the pH stability of this beverage product D is high. Usually, addition of 3 mg of caustic soda to 1 L of water results in a pH of 10.0, addition of 100 mg results in a pH of 11.5, and addition of 400 mg results in a pH of 12.1. In comparison, this beverage product D had a pH of 3.2 to 4.00 when 3.5 to 100 mL of the caustic soda solution was added. It had a pH of 3.25 even when 105 mg of caustic soda was added, and pH of 4.00 even when 1.05 g of caustic soda was added. Thus, the beverage product of the present embodiment stably maintained the acidity without significant changes in pH, demonstrating a high pH stability.

KEY TO REFERENCE SYMBOLS

10 Apparatus for producing beverage product
12 Well
14 5 μm filter
16 Activated carbon filter
17, 19, 21 2 μm filter
18 Storage tank
20 pH adjusting unit
22 Electrolyzing apparatus
24 Alkali tank
26 Acidic tank
27 Citric acid tank
28 Dissolving tank
30 Dissolving tank
32 Product tank
34 Bottle filling unit
A, B Aqueous solutions
C pH adjusted water
D Beverage product (Oral Rehydration Solution)

The invention claimed is:

1. A method of producing a Ready-To-Drink Oral Rehydration Solution product comprising an Oral Rehydration Solution in a sealed container, the Oral Rehydration Solution comprising, in an electrolyzed acidic water:
   a combination of buffering components consisting of:
   40 to 80 mM citric acid and 10 to 30 mM trisodium citrate;
   and glucose and sodium chloride,
   wherein the Oral Rehydration Solution has a pH of 3.0 or higher but lower than 4.0,
   wherein the Oral Rehydration Solution comprises sodium at 50 to 90 mEq/L, potassium at 15 to 25 mEq/L, chloride at 50 to 80 mEq/L, glucose at a molar concentration at least equal to that of sodium but not exceeding 111 mmol/L, and no phosphorus, and has an osmolarity of 200 to 310 mmol/L,
   provided that the Oral Rehydration Solution comprises: citric acid and trisodium citrate at a total concentration of 80 mM or lower; 70 to 111 mM glucose, and 35 to 50 mM sodium chloride,
   the method comprising:
   a step of electrolyzing a water containing an electrolyte to obtain the electrolyzed acidic water;
   a step of adding: the combination of buffering components consisting of citric acid and trisodium citrate; and glucose and sodium chloride to the electrolyzed acidic water to obtain the Oral Rehydration Solution; and
   a step of sealing the Oral Rehydration Solution into a container,
   wherein the electrolyte contained in the water during the electrolysis comprises: citric acid; or trisodium citrate; or citric acid and trisodium citrate.

2. The method according to claim 1, wherein the Oral Rehydration Solution further comprises one or more ingredients selected from the group consisting of sodium glutamate, sucralose, and a flavoring agent.

3. A method of producing a Ready-To-Drink Oral Rehydration Solution product comprising an Oral Rehydration Solution in a sealed container, the Oral Rehydration Solution comprising, in an electrolyzed acidic water:
   a combination of buffering components consisting of:
   40 to 80 mM citric acid and 10 to 30 mM trisodium citrate;
   and glucose and sodium chloride,
   wherein the Oral Rehydration Solution has a pH of 3.0 or higher but lower than 4.0,
   wherein the Oral Rehydration Solution comprises sodium at 50 to 90 mEq/L, potassium at 15 to 25 mEq/L, chloride at 50 to 80 mEq/L, glucose at a molar concentration at least equal to that of sodium but not exceeding 111 mmol/L, and no phosphorus, and has an osmolarity of 200 to 310 mmol/L,
   provided that the Oral Rehydration Solution comprises: citric acid and trisodium citrate at a total concentration of 80 mM or lower; 70 to 111 mM glucose, and 35 to 50 mM sodium chloride, wherein the Ready-To-Drink Oral Rehydration Solution product has a pH stability wherein a pH of 3.0 or higher but lower than 4.0 is maintained when 10.0 mL of 1.05 g/100 mL NaOH aqueous solution is added per 1 L of the Oral Rehydration Solution, the method comprising:

a step of electrolyzing a water containing an electrolyte to obtain the electrolyzed acidic water;

a step of adding: the combination of buffering components consisting of citric acid and trisodium citrate; and glucose and sodium chloride to the electrolyzed acidic water to obtain the Oral Rehydration Solution; and a step of sealing the Oral Rehydration Solution into a container, wherein the electrolyte contained in the water during the electrolysis comprises: citric acid; or trisodium citrate; or citric acid and trisodium citrate.

4. The method according to claim 3, wherein the Oral Rehydration Solution further comprises one or more ingredients selected from the group consisting of sodium glutamate, sucralose, and a flavoring agent.

\* \* \* \* \*